United States Patent
Sanchez et al.

(10) Patent No.: US 12,442,431 B2
(45) Date of Patent: Oct. 14, 2025

(54) VEHICLE-SUSPENSION SHOCK ABSORBER INCLUDING TRANSFER RING FOR CONTROLLABLE VALVE

(71) Applicant: Advanced Suspension Technology LLC, Northville, MI (US)

(72) Inventors: Simon Sanchez, Gijon (ES); Jose Ramon Martinez, Bilbao (ES)

(73) Assignee: Advanced Suspension Technology LLC, Northville, MI (US)

( * ) Notice: Subject to any disclaimer, the term of this patent is extended or adjusted under 35 U.S.C. 154(b) by 433 days.

(21) Appl. No.: 17/929,097

(22) Filed: Sep. 1, 2022

(65) Prior Publication Data

US 2024/0077127 A1    Mar. 7, 2024

(51) Int. Cl.
*F16F 9/36* (2006.01)
*B60G 13/08* (2006.01)
(Continued)

(52) U.S. Cl.
CPC .............. *F16F 9/369* (2013.01); *B60G 13/08* (2013.01); *B60G 2202/24* (2013.01); *B60G 2206/41* (2013.01); *B60G 2800/162* (2013.01); *F16F 9/18* (2013.01); *F16F 2222/12* (2013.01); *F16F 2224/0208* (2013.01); *F16F 2224/025* (2013.01); *F16F 2230/0005* (2013.01);
(Continued)

(58) Field of Classification Search
CPC ........ F16F 9/369; F16F 9/18; F16F 2222/128; F16F 2222/12; F16F 2224/0208; F16F 2224/025; F16F 2230/0005; F16F 2230/30; F16F 2232/08; F16F 2234/04; B60G 13/08; B60G 17/08; B60G 2202/24; B60G 2206/41; B60G 2800/162
See application file for complete search history.

(56) References Cited

U.S. PATENT DOCUMENTS 5,163,538 A * 11/1992 Derr .......................... F16F 9/46
188/282.4
5,603,392 A * 2/1997 Beck ....................... F16F 9/325
188/266.6

(Continued)

FOREIGN PATENT DOCUMENTS

CN        211737851 U    10/2020
DE        102014215655 A1    2/2015
(Continued)

OTHER PUBLICATIONS

Extended European Search Report regarding EP Application No. 23194427.3 dated Feb. 16, 2024 (9 pages).

*Primary Examiner* — Robert A. Siconolfi
*Assistant Examiner* — James K Hsiao
(74) *Attorney, Agent, or Firm* — Harness, Dickey & Pierce, P.L.C.

(57) ABSTRACT

A shock absorber for a suspension system of a vehicle includes a transfer ring fluidly connecting an intermediate chamber and the valve. The transfer ring includes a body and a seal unit. The seal unit includes a first seal, a second seal, and a connector. The first seal is between the transfer ring and the intermediate tube. The second seal is between the transfer ring and the valve. The connector is connected to the first seal and the second seal. The connector extends through the body from the first seal to the second seal.

16 Claims, 8 Drawing Sheets

(51) Int. Cl.
*B60G 17/08* (2006.01)
*F16F 9/18* (2006.01)

(52) U.S. Cl.
CPC ....... *F16F 2230/30* (2013.01); *F16F 2232/08* (2013.01); *F16F 2234/02* (2013.01)

(56) References Cited

U.S. PATENT DOCUMENTS

| | | | | |
|---|---|---|---|---|
| 5,651,433 | A * | 7/1997 | Wirth | F16F 9/325 188/266.6 |
| 5,924,528 | A | 7/1999 | Vermolen et al. | |
| 6,145,894 | A * | 11/2000 | Myers | F16F 9/0454 285/322 |
| 6,283,259 | B1 * | 9/2001 | Nakadate | F16F 9/369 188/299.1 |
| 6,527,093 | B2 * | 3/2003 | Oliver | F16F 9/464 188/315 |
| 6,978,871 | B2 * | 12/2005 | Holiviers | F16F 9/325 188/266.6 |
| 8,469,162 | B2 * | 6/2013 | Nishimura | F16F 9/325 188/266.2 |
| 8,584,818 | B2 * | 11/2013 | Murakami | F16F 9/348 188/322.15 |
| 8,899,391 | B2 * | 12/2014 | Yamasaki | F16F 9/465 188/315 |
| 9,169,888 | B2 * | 10/2015 | Nishimura | F16F 9/3235 |
| 9,353,822 | B2 * | 5/2016 | Yamasaki | B23P 19/04 |
| 9,850,976 | B2 * | 12/2017 | Schmidt | F16F 9/325 |
| 10,107,349 | B2 * | 10/2018 | Murakami | F16F 9/34 |
| 10,344,819 | B2 * | 7/2019 | Schmidt | F16F 9/3207 |
| 10,458,509 | B2 * | 10/2019 | Kobayashi | F16F 9/465 |
| 11,555,525 | B2 * | 1/2023 | Schmidt | F16F 9/369 |
| 11,906,015 | B2 * | 2/2024 | Deferme | F16F 9/185 |
| 12,146,548 | B2 * | 11/2024 | Deferme | F16F 9/185 |
| 2006/0283677 | A1 * | 12/2006 | Schmidt | F16F 9/325 188/322.19 |
| 2011/0073424 | A1 * | 3/2011 | Murakami | F16F 9/465 188/322.13 |
| 2012/0048666 | A1 * | 3/2012 | Murakami | F16F 9/348 188/315 |
| 2012/0073920 | A1 * | 3/2012 | Yamasaki | F16F 9/34 188/315 |
| 2012/0305349 | A1 * | 12/2012 | Murakami | F16F 9/325 188/266.6 |
| 2014/0339032 | A1 * | 11/2014 | Yamasaki | F16F 9/325 188/297 |
| 2015/0041265 | A1 * | 2/2015 | Yamashita | F16F 9/18 188/315 |
| 2015/0369324 | A1 * | 12/2015 | Schmidt | F16F 9/325 188/314 |
| 2021/0062887 | A1 * | 3/2021 | Schmidt | F16F 9/3257 |

FOREIGN PATENT DOCUMENTS

| | | |
|---|---|---|
| EP | 2232094 B1 | 8/2011 |
| JP | 6008366 B2 | 10/2016 |
| WO | 2009081363 A1 | 7/2009 |

* cited by examiner

VEHICLE-SUSPENSION SHOCK ABSORBER INCLUDING TRANSFER RING FOR CONTROLLABLE VALVE

FIELD

The present disclosure generally relates to shock absorbers. More particularly, the present disclosure relates to a shock absorber for a vehicle suspension system.

BACKGROUND

Shock absorbers for vehicles are commonly included in a wide variety of vehicle segments. Some vehicles include semi-active damping that adjusts damping levels according to road conditions and vehicle dynamics. The shock absorbers are between a body and the suspension system of the vehicle. A piston is located within the shock absorber. The piston is connected to the vehicle body or the suspension of the vehicle through a piston rod. As the shock absorber is compressed or extended, working fluid flows between rebound and compression chambers within the shock absorber to counteract vibrations. By adjusting the flow of working fluid between the chambers, greater or lower damping forces may be generated.

DETAILED DESCRIPTION

Figure 1:
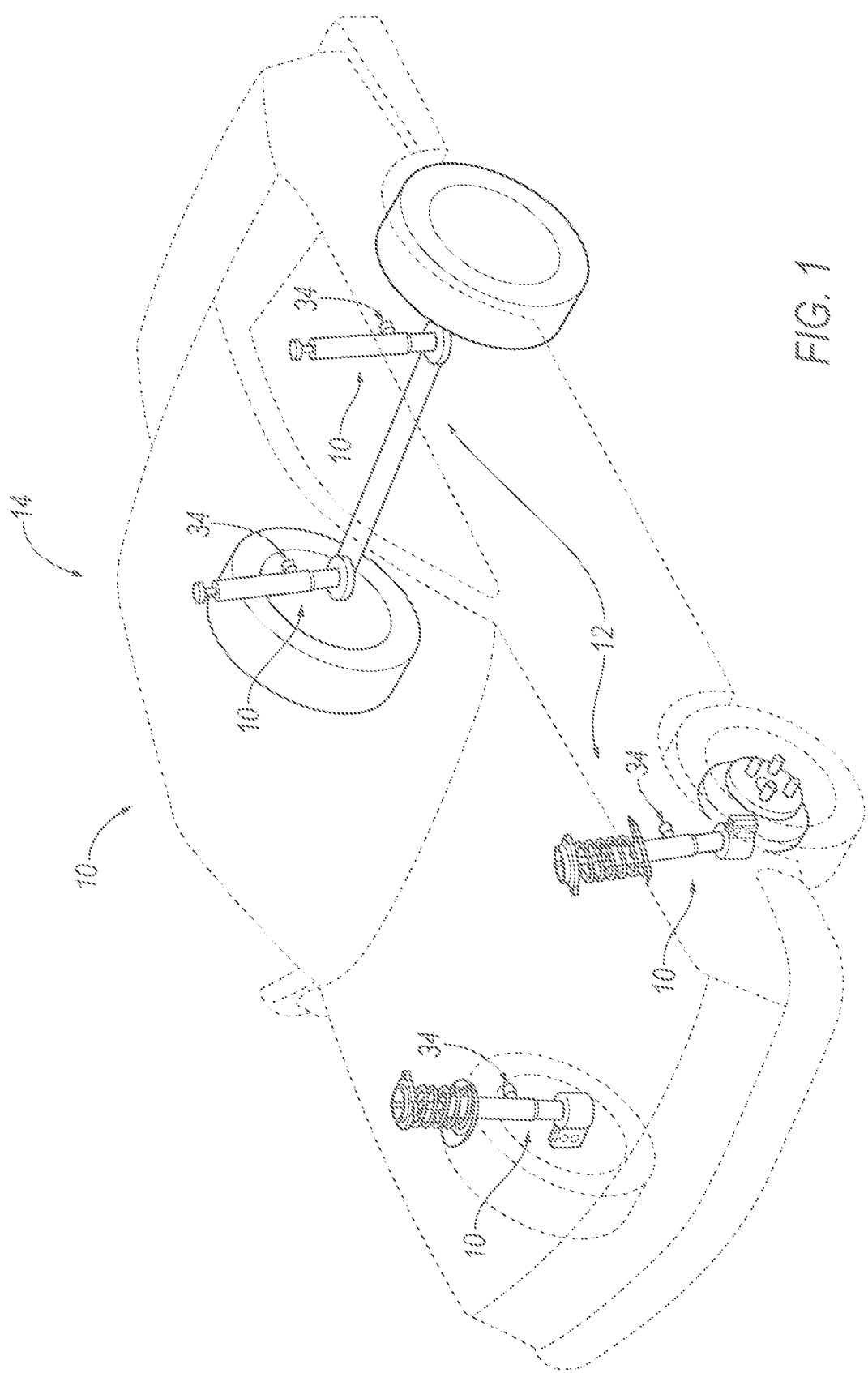
FIG. 1 is a schematic illustration of a vehicle including a suspension system having a plurality of shock absorber assemblies.

With reference to the figures, wherein like numerals identify like elements, a shock absorber 10 for a suspension system 12 of a vehicle 14 is generally shown. The shock absorber 10 includes an inner tube 16 defining an inner volume 18. A piston 20 is slidably disposed in the inner tube 16. The piston 20 divides the inner volume 18 of the inner tube 16 into a rebound working chamber 22 and a compression working chamber 24. An intermediate tube 26 is on the inner tube 16 and defines an intermediate chamber 28 between the inner tube 16 and the intermediate tube 26. The intermediate chamber 28 is in fluid communication with the inner volume 18 of the inner tube 16. The shock absorber 10 includes an outer tube 30. The inner tube 16 and the intermediate tube 26 are in the outer tube 30. The outer tube 30 defines a reserve chamber 32 between the outer tube 30 and the intermediate tube 26. A valve 34 fluidly, i.e., hydraulically, connects the intermediate chamber 28 and the reserve chamber 32. A transfer ring 36 fluidly connects the intermediate chamber 28 and the valve 34. The transfer ring 36 includes a body 38 and a seal unit 40. The seal unit 40 includes a first seal 42, a second seal 44, and a connector 46. The first seal 42 is between the transfer ring 36 and the intermediate tube 26. The second seal 44 is between the transfer ring 36 and the valve 34. The connector 46 is connected to the first seal 42 and the second seal 44. The connector 46 extends through the body 38 from the first seal 42 to the second seal 44.

Since the connector 46 connects the first seal 42 and the second seal 44, the transfer ring 36 has durability and fatigue resistance allowing for high internal hydraulic forces. The connector 46 also simplifies the assembly process of the transfer ring 36 and reduces the likelihood of assembly error. The design of the transfer ring 36 also allows for a range of materials including, in some examples, the availability of vulcanized rubber for the first seal 42, the second seal 44, and the connector 46 to provide durability and fatigue resistance and the availability of sintered metal for the body 38 of the transfer ring 36, which is cost effective.

The shock absorber 10 continuously adjusts damping levels according to road conditions and vehicle dynamics to dampen shocks and vibrations from variation in the road surface felt by occupants of the vehicle 14. FIG. 1 shows an example of the vehicle 14 having a suspension system 12 and a vehicle body. The suspension system 12 may include more than one shock absorber 10. The shock absorbers 10 may be coupled with a coil spring. The performance of the shock absorber 10 is electronically controlled, specifically with damping levels controlled by an electronic control unit (ECU 48). The ECU 48 receives information (e.g., acceleration, speed, pitch, yaw, roll, steering, braking) from sensors 76 at various locations on the vehicle 14 to make independent adjustments to each shock absorber 10.

Figure 2:
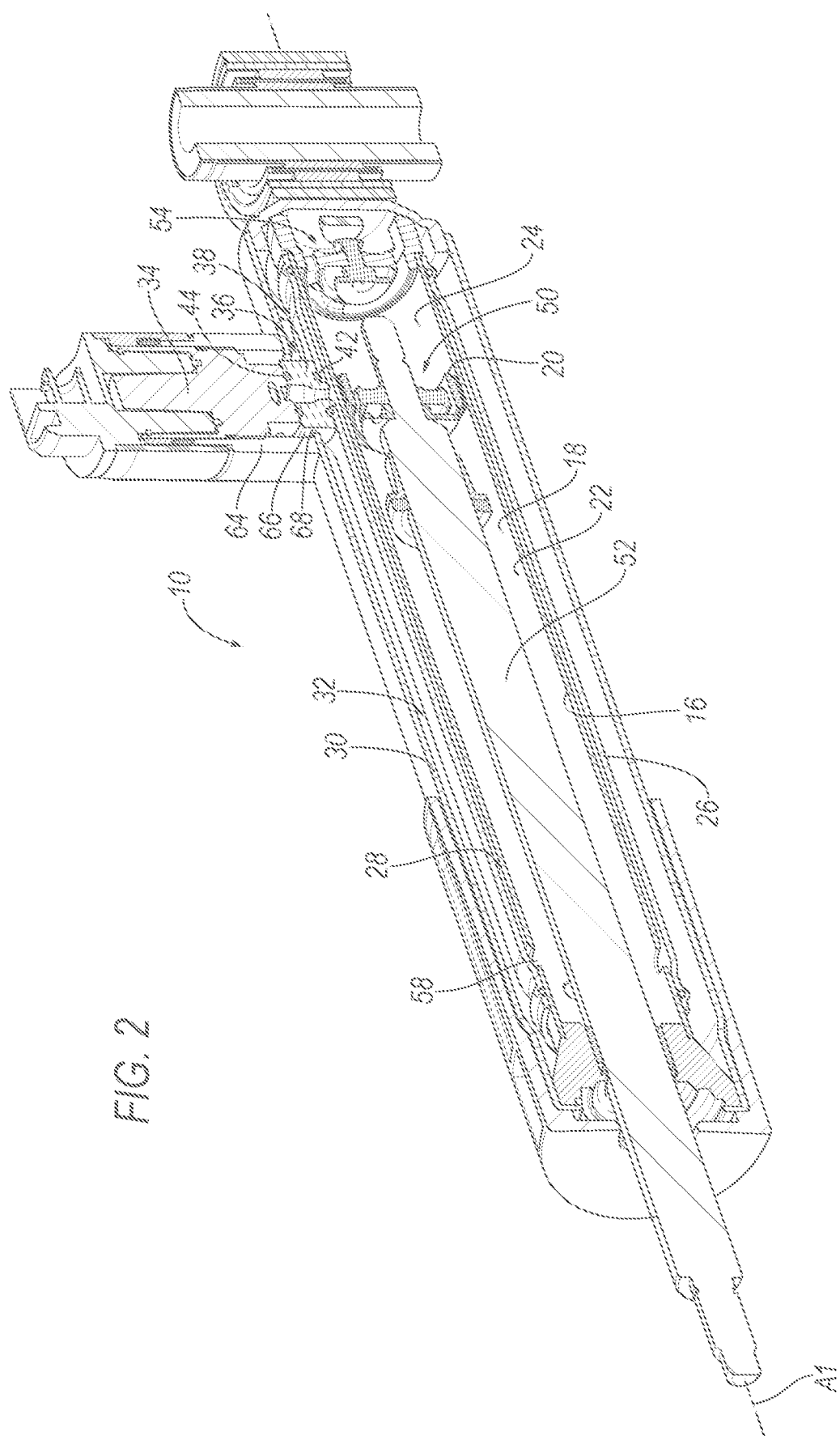
FIG. 2 is a cross-sectional view of the shock absorber.

With reference to FIG. 2, the intermediate tube 26 is on the inner tube 16 defining the intermediate chamber 28 between the inner tube 16 and the intermediate tube 26. The inner tube 16 and the intermediate tube 26 are in the outer tube 30. The inner tube 16, the outer tube 30, and the intermediate tube 26 may be concentric. The outer tube 30 and the inner tube 16 define the reserve chamber 32 between the outer tube 30 and the inner tube 16 and between the outer tube 30 and the intermediate tube 26. The reserve chamber 32 may be annular and continuous about the inner tube 16 and the intermediate tube 26. The inner tube 16 defines the inner volume 18, which is selectively in communication with the reserve chamber 32. Specifically, the inner tube 16 and the intermediate tube 26 define the intermediate chamber 28 that is open to the inner volume 18 and selectively in communication with the reserve chamber 32 through the valve 34, as described further below.

The rebound working chamber 22, the intermediate chamber 28, and the reserve chamber 32 contain a working fluid, e.g., a liquid such as hydraulic oil and/or gas. The working fluid flows between the rebound working chamber 22 and the reserve chamber 32 through the valve 34 and the intermediate chamber 28 to adjust damping levels of the shock absorber 10. The valve 34 provides one-way flow from the rebound working chamber 22 to the reserve chamber 32, i.e., active valving. The shock absorber 10 includes passive valves as described further below.

With continued reference to FIG. 2, the shock absorber 10 includes a piston assembly 50 including a rod 52 and a piston 20. The piston 20 is in the inner tube 16 and the rod 52 extends externally of outer tube 30 through a rod guide assembly (not numbered). The piston 20 is slidably disposed in the inner tube 16. The piston 20 divides the inner volume 18 of the inner tube 16 into a rebound working chamber 22 and a compression working chamber 24. The compression working chamber 24 may contain the working fluid and the piston 20 may allow for controlled flow of the working fluid through and/or around the piston 20 between the compression working chamber 24 and the rebound working chamber 22. For example, the piston 20 may include flow-control features such as channels, spring plates, blow-off plates, valves, etc., that allow flow of the working fluid between the compression working chamber 24 and the rebound working chamber 22 and may provide controlled resistance to such flow.

With continued reference to FIG. 2, the shock absorber 10 may include a base valve 54. The base valve 54 is between the compression working chamber 24 and the reserve chamber 32. Specifically, the base valve 54 has ports between the working chamber 24 and the reserve chamber 32 and flow-control features that allow for controlled flow of the working fluid through and/or around the base valve 54 between the compression working chamber 24 and the reserve chamber 32. For example, the flow-control features of the base valve 54 may include channels, spring plates, blow-off plates, valves, etc., that allow flow of the working fluid between the compression working chamber 24 and the reserve chamber 32 and may provide controlled resistance to such flow.

The working fluid in the inner volume 18 flows between the rebound working chamber 22 and the reserve chamber 32 and flow from the rebound working chamber 22 to the reserve chamber 32 is actively controlled by the valve 34. During rebound of the shock absorber 10, the piston 20 reduces the rebound working chamber 22 and expands the compression working chamber 24. This movement compresses working fluid in the rebound working chamber 22 and the working fluid flows from the rebound working chamber 22 to the reserve chamber 32 as controlled by the valve 34. During this movement, the working fluid may also flow through and/or around the piston 20 from the rebound working chamber 22 to the compression working chamber 24 and/or the working fluid may flow through and/or around the base valve 54 from the reserve chamber 32 to the compression working chamber 24. During compression of the shock absorber 10, the piston 20 expands the rebound working chamber 22 and reduces the compression working chamber 24. During this movement, the working fluid may flow through and/or around the piston 20 from the compression working chamber 24 to the rebound working chamber 22 and/or the working fluid may flow through and/or around the base valve 54 from compression working chamber 24 to the reserve chamber 32. As set forth above, the valve 34 is a one-way valve that controls flow of the working fluid from the rebound working chamber 22 to the reserve chamber 32 and thus the working fluid does not flow through the valve 34 during the compression stroke of the shock absorber 10.

The inner tube 16, the intermediate tube 26, and the outer tube 30 may each be tubular, as shown in FIG. 2. Specifically, the inner tube 16, the intermediate tube 26, and the outer tube 30 may have a circular cross-section and may have a cylindrical shape. The inner tube 16, the intermediate tube 26, and the outer tube 30 may be elongated along an axis A1. Specifically, the inner tube 16, the intermediate tube 26, and the outer tube 30 may be coaxial on the axis A1 and concentric about the axis A1. The inner tube 16, the intermediate tube 26, and the outer tube 30 may be, for example, metal or other rigid material as is known.

As set forth above, the inner tube 16 defines the inner volume 18. Specifically, the inner tube 16 has an inner wall and the piston 20 abuts the inner wall. The piston assembly 50 may include one or more seals, e.g., metal rings, between the piston 20 and the inner wall of the inner tube 16.

The inner tube 16 contains the working fluid. The working fluid leaves the inner tube 16 and flows into the intermediate tube 26, as described further below, during operation of the damper assembly. In addition, the working fluid may leave the inner tube 16 and flow into other dampening features, but in any event, the working fluid does not exit the shock absorber 10 under normal operation.

The rod 52 of the piston assembly 50 extends through one end of the inner tube 16. The shock absorber 10 assembly includes seals between the rod 52 and the inner tube 16 to contain the working fluid in the inner tube 16.

The inner volume 18 is in fluid communication with the intermediate chamber 28. Specifically, in the example shown in the figures, the rebound working chamber 22 is in fluid communication with the intermediate chamber 28. For example, the inner tube 16 has an orifice 58 from the rebound working chamber 22 to the intermediate chamber 28 between the inner tube 16 and the intermediate tube 26. The orifice 58 is open to the intermediate chamber 28 and the rebound working chamber 22 so that the working fluid may flow through the orifice 58. The inner tube 16 may have any suitable number of orifices 58 between the rebound working chamber 22 and the intermediate chamber 28. The orifice 58 defines a contact area that represents the two-dimensional area through which the working fluid flows.

The intermediate tube 26 is tubular and extend circumferentially around the inner tube 16, e.g., concentric with the inner tube 16. The intermediate tube 26 may be referred to as a "transfer tube." The intermediate tube 26 is sealed to the inner tube 16 at two ends of the intermediate tube 26 spaced along the axis A1. The intermediate tube 26 is radially spaced from the inner tube 16 to define the intermediate chamber 28 therebetween. The intermediate chamber 28 may be annular and continuous about the inner tube 16. The intermediate chamber 28 allows the working fluid to flow between the rebound working chamber 22 and the valve 34. As set forth above, the intermediate chamber 28 is in fluid communication with the inner volume 18 of the inner tube 16, e.g., the rebound working chamber 22, through, for example, the orifice 58.

The outer tube 30 is tubular and extends circumferentially around the intermediate tube 26 and the inner tube 16, e.g., concentric with the intermediate tube 26 and the inner tube 16. The outer tube 30 is radially spaced from the intermediate tube 26 and the inner tube 16 to define the reserve chamber 32 therebetween. Specifically, in the example shown in the figures, the reserve chamber 32 is longer than the intermediate tube 26 along the axis A1 so that a portion of the reserve chamber 32 extends directly between the outer tube 30 and the intermediate tube 26 and a portion of the reserve chamber 32 extends directly between the outer tube 30 and the inner tube 16. The outer tube 30 is sealed at ends to contain the working fluid. The reserve chamber 32 may be annular and continuous about the intermediate tube 26 and the inner tube 16. The working fluid flows into and out of the reserve chamber 32 from the valve 34, as described below.

The intermediate tube 26 allows the working fluid to flow between the intermediate chamber 28 and the valve 34. For example, the intermediate tube 26 has an orifice 60 from the intermediate chamber 28 to the valve 34. The orifice 60 is open to the intermediate chamber 28 and the electronic so that the working fluid may flow through the orifice 60 based on operation of the valve 34.

The transfer ring 36 provides fluid communication between the intermediate chamber 28 and the valve 34. The transfer ring 36 may also be referred to as a "hydraulic connection." The working fluid flows through transfer ring 36 from the intermediate chamber 28 to the valve 34 and from the valve 34 to the intermediate chamber 28. The transfer ring 36 has a bore 62 in fluid communication with the valve 34 and the intermediate chamber 28. Specifically, the bore 62 of the transfer ring 36 extends uninterrupted from the intermediate chamber 28 to the valve 34. The transfer ring 36 is sealed to the valve 34 and is sealed to the intermediate chamber 28, as described further below.

Figure 3:
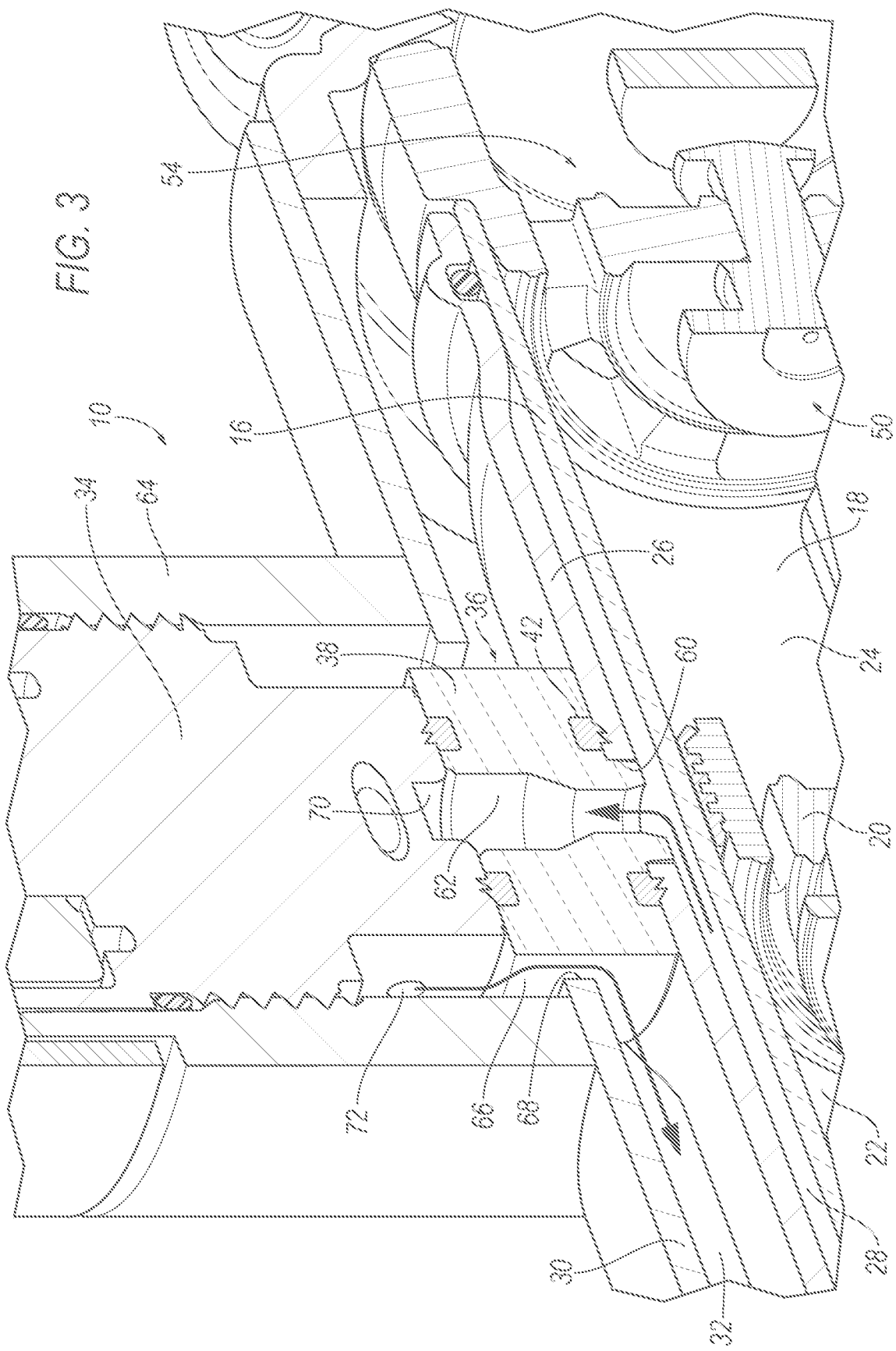
FIG. 3 is magnified view of a portion of FIG. 2.

With reference to FIGS. 2 and 3, the transfer ring 36 extends from the intermediate tube 26 to the valve 34 through the reserve chamber 32. The valve 34 is open to the reserve chamber 32 and is connected to the intermediate chamber 28 by the bore 62 of the transfer ring 36.

With continued reference to FIGS. 2 and 3, the shock absorber includes a valve housing 64 sealed to the outer tube 30 and sealed to the valve 34. The valve housing 64 may be fixed to the outer tube 30 by, for example, welding, adhesive, bonding, etc. The valve housing 64 is open to the reserve chamber 32. Specifically, the valve housing 64 has a cavity 66 open to the reserve chamber 32. The valve 34 is open to the reserve chamber 32 through the valve housing 64 so that the working fluid may flow through the valve housing 64 from the valve 34 to the reserve chamber 32.

The outer tube 30 defines an opening 68 and the valve housing 64 is sealed to the outer tube 30 around the opening 68 and is sealed to the valve 34. The valve housing 64 surrounds the opening 68 and is sealed to the outer tube 30 completely around the opening 68 to contain the working fluid in the outer tube 30 and the cavity 66 of the valve housing 64. The transfer ring 36 and/or the valve 34 extends through the opening 68. In the example shown in the figures, the transfer ring 36 extends through the opening 68 from the intermediate tube 26 into the cavity 66 of the valve housing 64 to the valve 34. The opening 68 is radially spaced from the transfer ring 36 defining a flow path therebetween. The flow path is open between the cavity 66 of the valve housing 64 and the reserve chamber 32 to allow the working fluid to flow from the cavity 66 to the reserve chamber 32 and from the reserve chamber 32 to the cavity 66.

The valve 34 is fluidly connected to the rebound working chamber 22 and the reserve chamber 32. Specifically, the valve 34 fluidly connects the intermediate chamber 28 and the reserve chamber 32.

The valve 34 is in the cavity 66 of the valve housing 64 and is sealed to the bore 62 of the transfer ring 36. Specifically, the valve 34 includes a first port 70 in the cavity 66 of the valve housing 64 a second port 72 at the bore 62 of the transfer ring 36. The second port 72 supplies the working fluid to the cavity 66 of the valve housing 64 as controlled by the valve 34. The first port 70 supplies the working fluid from the bore 62 of the transfer ring 36 to the second port 72 as controlled by the valve 34. The valve 34 may include more than one first port 70, e.g., a plurality of second ports 72 spaced circumferentially around the valve 34 and each connected to the first port 70.

The valve 34 controls flow through the valve 34 from the first port 70 to the second port 72. The valve 34 may be electrically activated, i.e., with power from an electrical source of the vehicle 14, to open and close communication between the first port 70 and the second port 72. In other words, the valve 34 may be an electric valve 34. The valve 34 may be, for example, include a solenoid that opens and closes communication between the first port 70 and the second port 72 and/or may have any suitable features for opening 68 and closing communication between the first port 70 and the second port 72 including those that are known.

The valve 34 may have a variable-flow resistance to vary flow rate through the valve 34. In other words, the valve 34 may be a flow-control valve. Specifically, the valve 34 is configured to vary flow rate through the valve 34 between the first port 70 and the second port 72. In other words, the valve 34 may open and close and may adjust the flow rate between the first port 70 and the second port 72 to varying flow of working fluid therethrough, specifically with no flow when the valve 34 is closed and with variable flow rate based on the variable open position of the valve 34. The variable-flow may be accomplished by adjustment of the size of the flow path through the valve 34. Specifically, the variable-flow resistance may be accomplished by varying the size of an orifice in the valve 34 between the first port 70 and the second port 72. As an example, the valve 34 may be an electric flow-control valve 34. In such an example, the valve 34 includes a solenoid that varies the size of the orifice in the valve 34 between the first port 70 and the second port 72.

Figure 8:
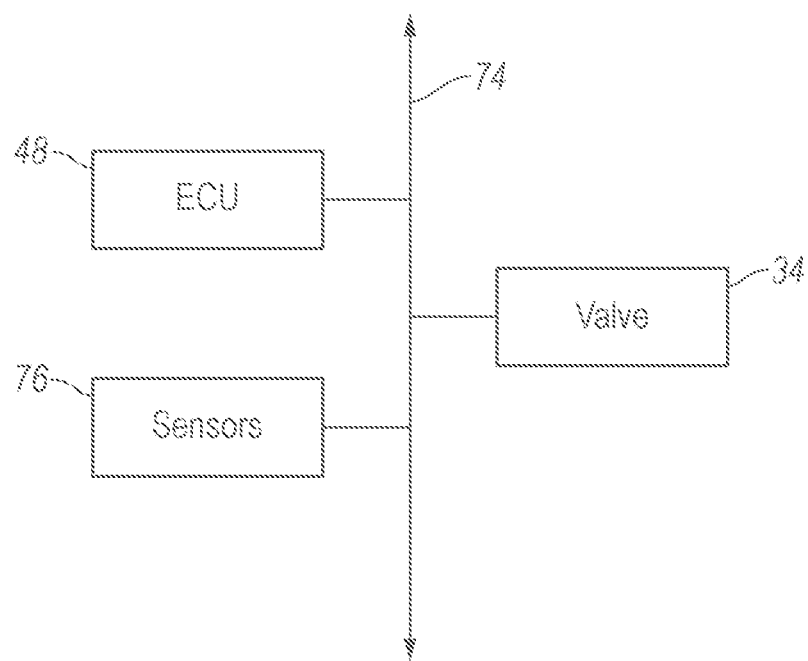
FIG. 8 is a schematic of a system of a vehicle including an electronic control unit that controls operation of a valve of the shock absorber.

The variable flow resistance may be adjusted based on conditions to vary dampening by the shock absorber 10. Specifically, the shock absorber 10 may include the ECU 48 (FIG. 8) that controls the valve 34. In examples in which the valve 34 is an electric flow-control valve with a solenoid, the solenoid is operably controlled by the ECU 48. The ECU 48 receives information (e.g., acceleration, speed, pitch, yaw, roll, steering, braking) from the vehicle 14 and adjusts the valve 34 (i.e., sets the valve 34 at the closed position or any variable open position) to adjust flow through the valve 34. For example, the ECU 48 may cause the valve 34 to restrict flow of the working fluid through the reserve chamber 32 to provide a harder ride or provide less restriction through the reserve chamber 32 to provide a softer ride. The information from the vehicle 14 that is used to control the operation of the valve 34 is detected by sensors 76 of the vehicle 14 at various locations on the vehicle 14. In examples including multiple shock absorbers 10, each shock absorber 10 may be independently operable at a different flow to independently change the damping rate to adapt to varying road conditions. In such examples, the multiple shock absorbers 10 may each include an ECU 48 dedicated to the respective shock absorber 10 or multiple shock absorbers 10 may share one ECU 48.

The ECU 48 may be a computer having a processor and a storage medium storing instructions executable by the processor to control the valve 34. The ECU 48 may, for example, a suspension control module including electronic hardware including, for example, electronic hardware that is known. The storage medium may be any non-transitory computer-readable storage medium or machine-readable storage medium, such as an optical, magnetic or semiconductor storage medium. In various implementations, the storage medium may be an article of manufacture. In some implementations, storage medium may store computer-executable instructions, such as computer-executable instructions to implement logic flow. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The vehicle 14 includes a communication network 74 that can include a bus in the vehicle 14 such as a controller area network (CAN) or the like, and/or other wired and/or wireless mechanisms. Via the vehicle network, the computer may transmit messages to various devices in the vehicle 14 and/or receive messages (e.g., CAN messages) from the various devices, e.g., sensors, an actuator, a human machine interface (HMI), etc.

FIG. 3 shows the flow path for a rebound stroke with fluid flow of the working fluid identified by arrows. In a rebound stroke, the piston 20 moves away from the compression working chamber 24 and the working fluid is pressurized in the rebound working chamber 22. The valve 34 is selectively opened, in which case working fluid flows from the rebound working chamber 22, through the orifice 58, through the intermediate chamber 28, through the orifice 60 into the bore 62 of the transfer ring 36, to the valve 34. The valve 34 controls flow of the working fluid from the first port 70 to the second port 72. When the valve 34 allows flow of working fluid from the first port 70 to the second port 72, the working fluid flows from the first port 70, into the cavity 66 of the valve housing 64, and into the reserve chamber 32.

In a rebound stroke, pressure in the compression working chamber 24 is reduced. In examples including flow-control features on the piston 20 and/or the base valve 54, the flow control features may allow the working fluid to flow from rebound working chamber 22 to the compression working chamber 24 through and/or around the piston 20 and from the reserve chamber 32 to the compression working chamber 24 through and/or around the base valve 54 during the rebound stroke.

In a compression stroke, pressure in the compression working chamber 24 is increased. The valve 34 does not allow flow of the working fluid from the reserve chamber 32 to the intermediate chamber 28 through the valve 34. In examples including flow-control features on the piston 20 and/or the base valve 54, the flow control features may allow the working fluid to flow from compression working chamber 24 to the rebound working chamber 22 through and/or around the piston 20 and from the compression working chamber 22 to the reserve chamber 32 and through and/or around the base valve 54 from the compression working chamber 22 to the reserve chamber 32.

With reference to FIG. 3, the transfer ring 36 extends from intermediate tube 26 to the valve 34. The transfer ring 36 fluidly connects the intermediate chamber 28 and the valve 34. Specifically, the bore 62 extends from intermediate chamber 28 to the valve 34. The transfer ring 36 provides uninterrupted fluid communication between the intermediate chamber 28 and the valve 34. The transfer ring 36 extends from the intermediate tube 26 through the reserve chamber 32 to the valve 34 and the bore 62 extends uninterrupted from the orifice 60 of the intermediate tube 26 to the second port 72 of the valve 34.

Figure 4:
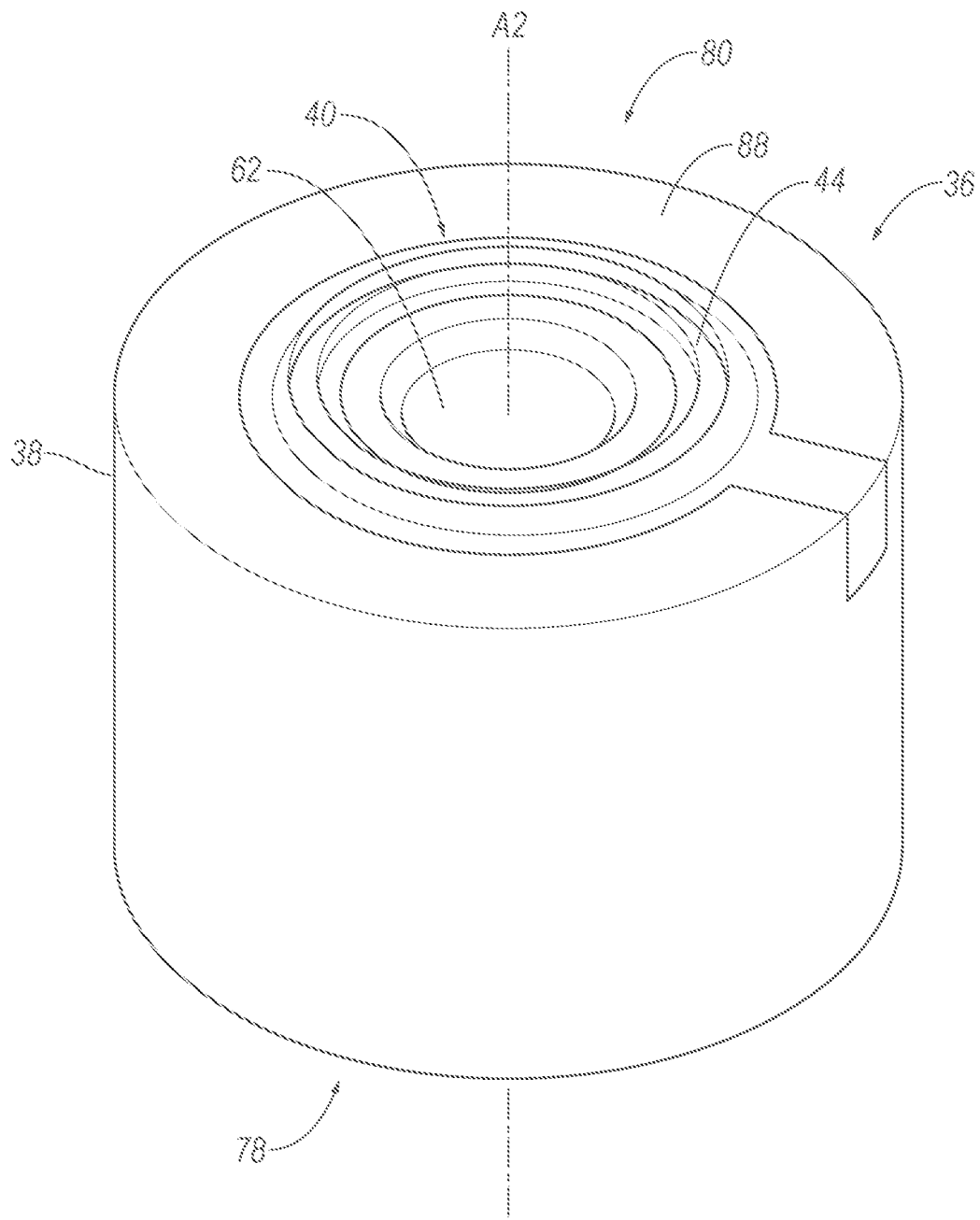
FIG. 4 is a perspective view of a transfer ring of the shock absorber.
Figure 5:
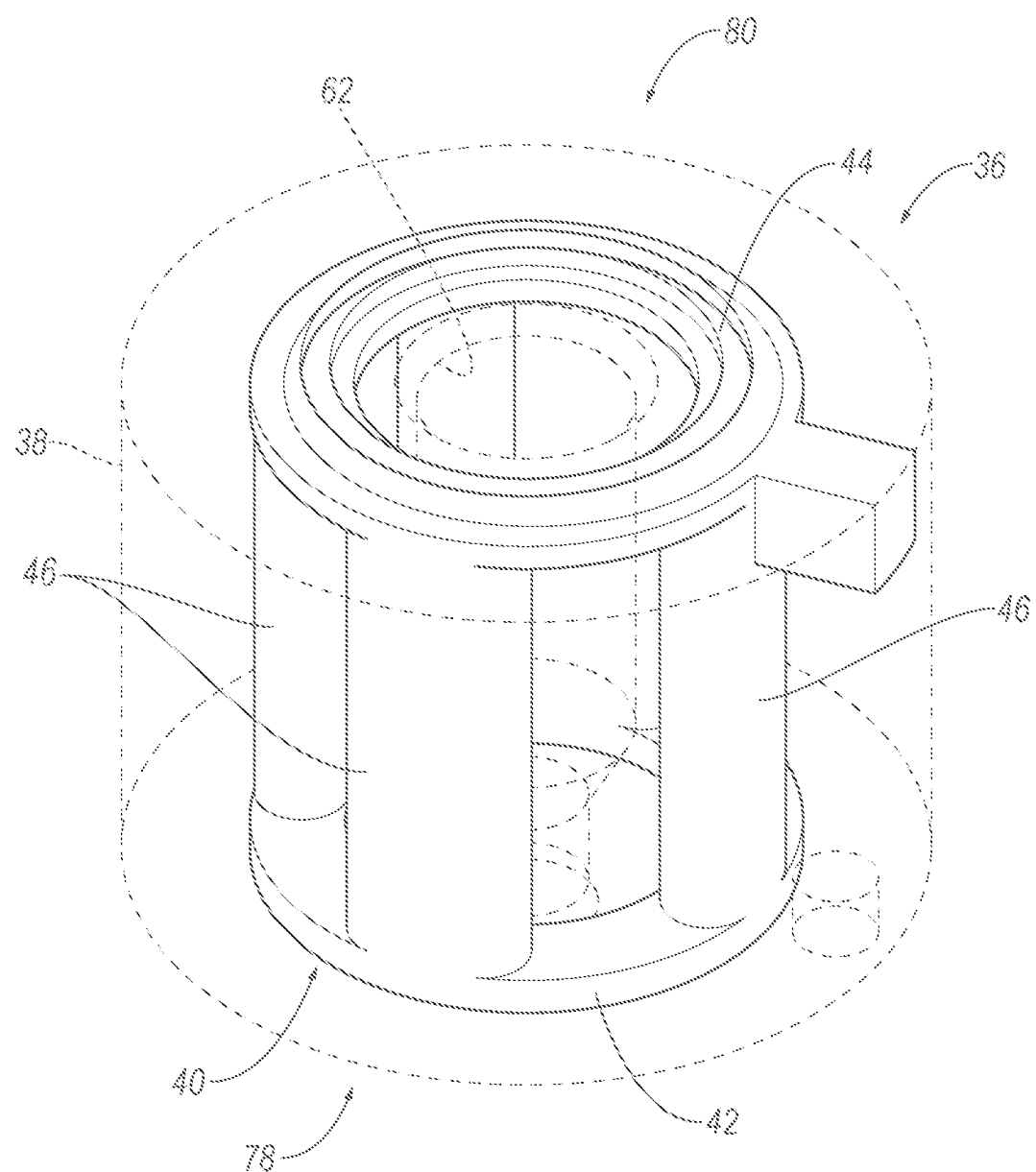
FIG. 5 is a perspective view of the transfer ring with a body of the transfer ring in broken lines to show a seal unit of the transfer ring.
Figure 6:
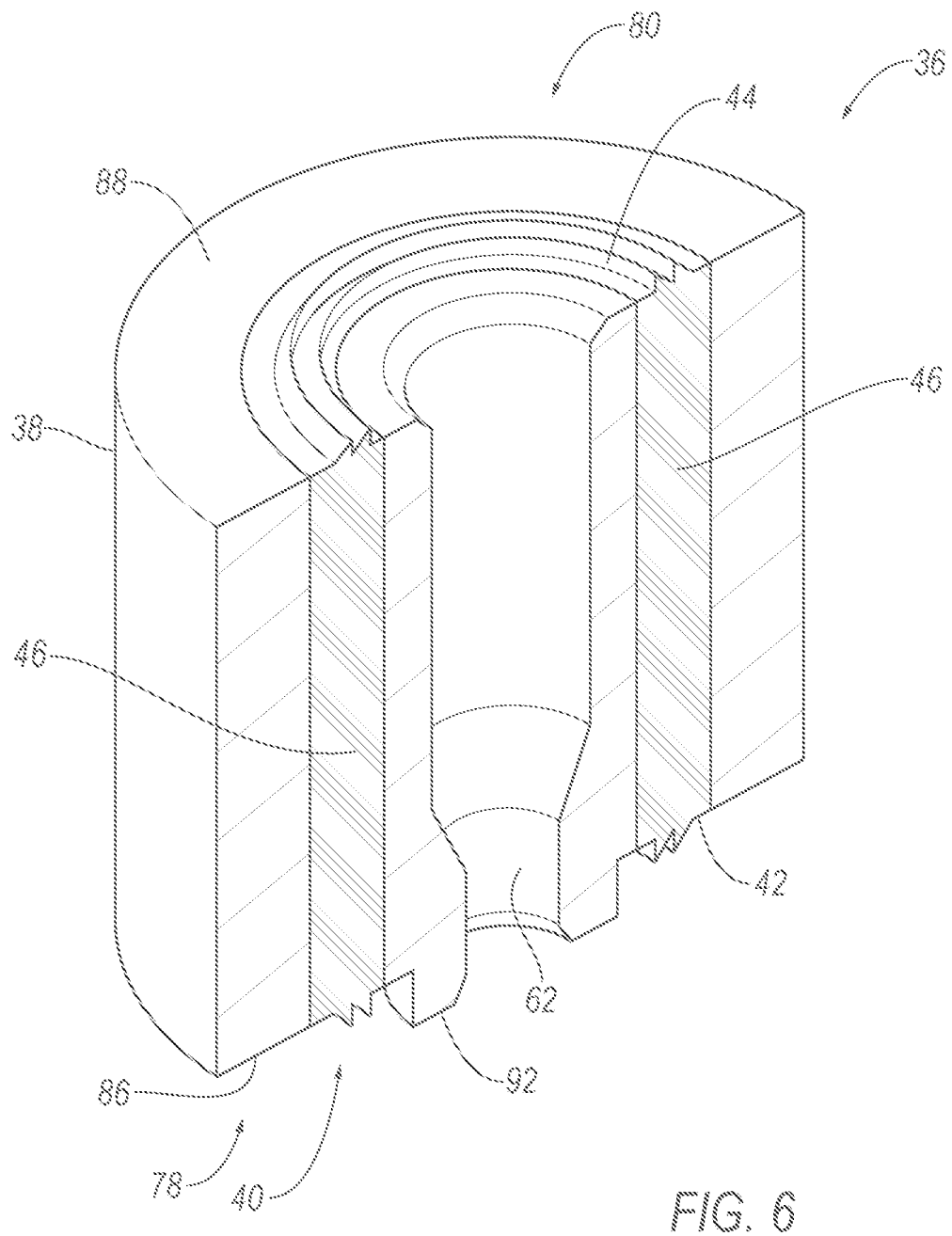
FIG. 6 is a cross-sectional view of the transfer ring.
Figure 7:
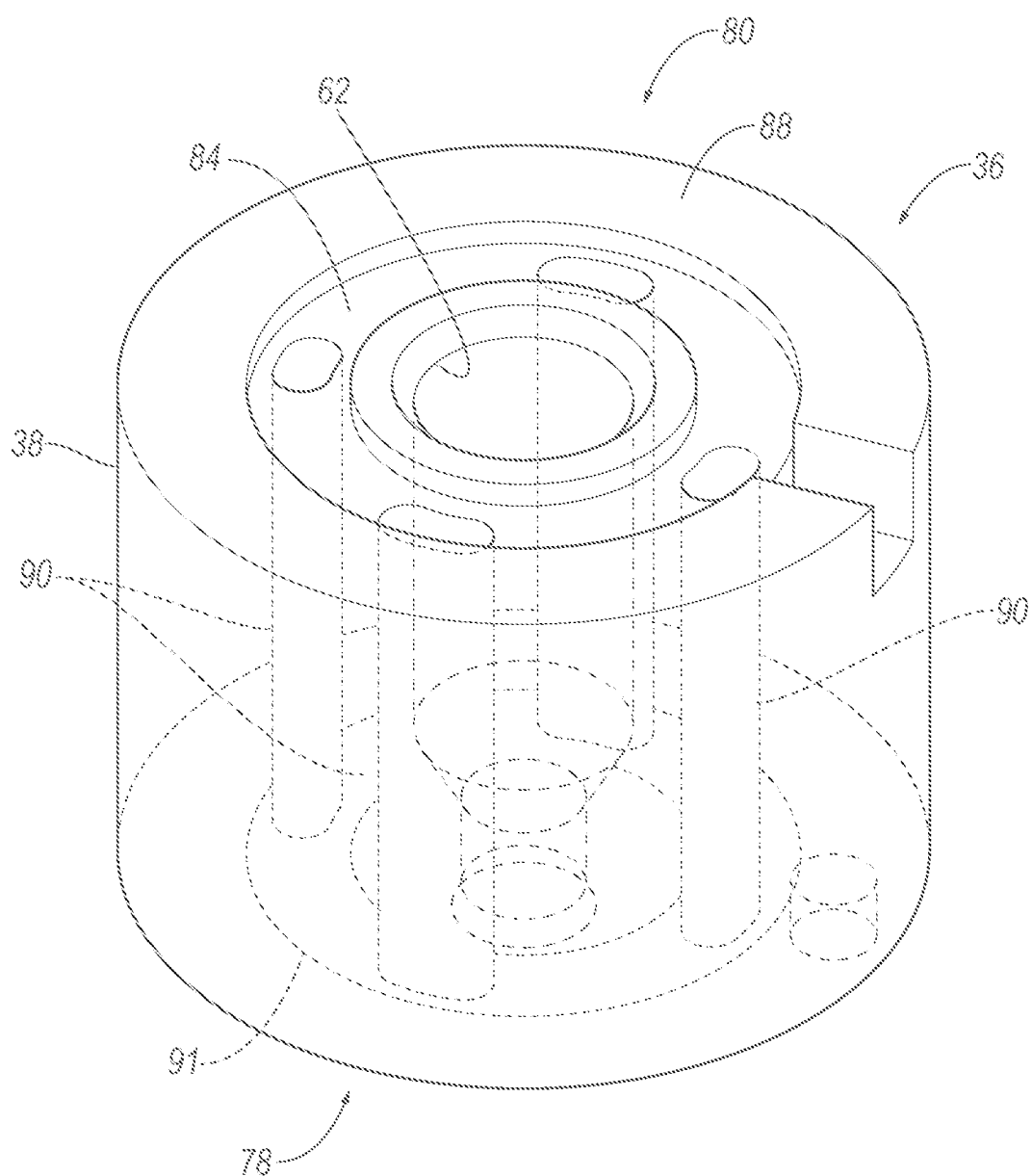
FIG. 7 is a perspective view of the body of the transfer ring.

With reference to FIGS. 4-6, the transfer ring 36 includes the body 38 and the seal unit 40. The body 38 defines the bore 62 that extends from the orifice 60 of the intermediate tube 26 to the second port 72 of the valve 34. The seal unit 40 seals between the body 38 and the valve 34 and between the body 38 and the intermediate tube 26. The seal unit 40 prevents leakage of the working fluid between the body 38 and the valve 34 and between the body 38 and the intermediate tube 26.

The transfer ring 36, and specifically the body 38, extends radially relative to the intermediate tube 26 from the intermediate tube 26 through the opening 68 of the outer tube 30. In other words, the length of the transfer ring 36 from the intermediate tube 26 to the valve 34 is larger than the radial thickness of the reserve chamber 32. The width of the body 38, i.e., in a direction radially from the bore 62, is less than a diameter of the opening 68 of the outer tube 30. The opening 68 defines a flow path between the outer tube 30 and the body 38 of the transfer ring 36 to allow flow of the working fluid between the reserve chamber 32 and the cavity 66 of the valve housing 64. As an example, as shown in the example in the figures, the body 38 and the cylinder may be cylindrical and may be coaxial, in which case the diameter of the body 38 is less than the diameter of the opening 68.

The body 38 of the transfer ring 36 includes a first face 78 and a second face 80 spaced from each other. The first face 78 is at the intermediate tube 26 and the second face 80 is at the valve 34. The body 38 terminates at the first face 78 and the second face 80. The first face 78 and the second face 80 may be shaped to mate with corresponding surfaces of the intermediate tube 26 and the valve 34, respectively. The body 38 may have an axis A2 through the first face 78 and the second face 80. For example, the body 38 may be elongated along the axis A2 from the first face 78 to the second face 80. The axis A2 may be perpendicular to the axis A1. As set forth above, the body 38 may be cylindrical, in which case the first end and the second end are circular, i.e., are the ends of the cylinder.

The body 38 may include seal seats supporting the seals. The seal seats may be on the first face 78 and/or the second face 80. In the example shown in the figures, the body 38 includes one seal seat (referred to as "the first seal seat 82") on the first face 78 and one seal seat (referred to as "the second seal seat 84") on the second face 80. In other examples, the body 38 may include no seal seat or more than one seal seat on either of the first face 78 and the second face 80. The seal seats 82, 84 are designed to receive the seals 42, 44, i.e., sized, shaped, and positioned to receive the respective seal. Specifically, the first seal seat 82 is designed to receive the first seal 42 and the second seal seat 84 is designed to receive the second seal 44. The first seal seat 82 is recessed relative to an end surface 86 of the first face 78 and the second seal seat 84 is recessed relative to an end surface 88 of the second face 80. The seal seats 82, 84 are endless around the axis A2. The seal seats 82, 84 may be circular, and more specifically, annular about the axis A2, as shown in the example in the figures.

The body 38 of the transfer ring 36 includes at least one internal channel 90 extending from first face 78 to the second face 80. The internal channel 90 is continuous from the first face 78 to the second face 80. As described further below, the connector 46 extends continuously through the internal channel 90 from the first face 78 to the second face 80. In examples including the first seal seat 82 and the second seal seat 84, the connector 46 extends from the first seal seat 82 to the second seal seat 84. The body 38 may have more than one internal channel 90. In such example, the internal channels 90 may be spaced from each other in an annular path around the axis A2. In examples including more than one internal channel 90, the internal channels 90 may be identical to each other or may have differences. A common numeral is used to identify the multiple internal channels 90 in the figures.

The internal channel 90 is spaced from the bore 62 from the first face 78 to the second face 80. In other words, the internal channel 90 is not in fluid communication with the bore 62 and the working fluid in the bore 62 does not contact the internal channel 90. The internal channel 90 is spaced radially from the bore 62. In examples including more than one internal channel 90, the internal channels 90 may be spaced from each other from the first face 78 to the second face 80. The internal channel 90 and the bore 62 may be elongated parallel to each other, and more specifically, may each be elongated along the axis A2.

As set forth above, the seal unit 40 includes the first seal 42, the second seal 44, and at least one connector 46 between the first seal 42 and the second seal 44. As described further below, the first seal 42 seals the transfer ring 36 to the intermediate tube 26 and the second seal 44 seals the transfer ring 36 to the valve 34. The connector 46 connects the first seal 42 and the second seal 44 to retain the first seal 42 and the second seal 44 to the body 38.

The first seal 42 seals the transfer ring 36 to the intermediate tube 26 and the second seal 44 seals the transfer ring 36 to the valve 34. Specifically, the first seal 42 seals the first end of the body 38 to the intermediate tube 26 and the second seal 44 seals the second end of the body 38 to the valve 34. In other words, the first seal 42 prevents flow of working fluid between the first end and the intermediate tube 26 and the second seal 44 prevents flow of working fluid between the second end and the valve 34.

The first seal 42 is designed to seal to the first end and the intermediate tube 26 and the second seal 44 is designed to seal to the second end and the valve 34. As an example, the first seal 42 may be sized and shaped to fill the first seal seat 82 and the second seal 44 may be sized and shaped to fill the second seal seat 84. The first seal 42 and/or the second seal 44 may include sealing fingers. In the example shown in the figures, the first seal 42 includes sealing fingers abutting the intermediate tube 26 and the second seal 44 includes sealing fingers abutting the valve 34.

The first seal 42 and the second seal 44 extend endlessly around the bore 62. For example, the first seal 42 extends endlessly around the orifice 60 of the intermediate tube 26 to seal the working fluid in a flow path between the orifice 60 and the bore 62. The second seal 44 extends endlessly around the second port 72 of the valve 34 to seal the working fluid in a flow path between the second port 72 and the bore 62. As an example, as shown in the example in the figures, the first seal 42 and the second seal 44 are annular around the bore 62. In the example shown in the figures, the body 38 includes a nipple 92 that extends into the orifice 60 of the intermediate tube 26 and the first seal 42 extends endlessly around the nipple 92.

The seal unit 40 may include more than one connector 46. In such examples, the connectors 46 may be identical to each other or may have differences. A common numeral is used to identity the multiple connectors 46 in the figures.

The first seal 42 and the second seal 44 are connected to the connector 46. In other words, the first seal 42 and the second seal 44 are not removeable from the connector 46 without destruction of the first seal 42, the second seal 44, and/or the connector 46. The connector 46 extends through the body 38 from the first seal 42 to the second seal 44. The connector 46 extends continuously from the first seal 42 to the second seal 44.

The connector 46 is in the internal channel 90 of the body 38. Specifically, the connector 46 may fill the internal channel 90. In examples, including more than one connector 46, the connectors 46 are spaced from each other from the first seal 42 to the second seal 44. The connectors 46 may be elongated parallel to each other, and more specifically, may each be elongated along the axis A2 of the transfer ring 36.

The seal unit 40 is unitary. Specifically, the first seal 42, the second seal 44, and the connector 46 (or connectors 46) are unitary. In other words, the first seal 42, the second seal 44, and the connector 46 (or connectors 46) are a single, uniform piece of material with no seams, joints, fasteners, or adhesives holding it together, i.e., formed together simultaneously as a single continuous unit. For example, the first seal 42, the second seal 44, and the connector 46 (or connectors 46) may be formed together by overmolding as a unit onto the body 38. Non-unitary components, in contrast, are formed separately and subsequently assembled, e.g., adhesive, bonding, ultrasonic welding, etc.

As one example, of the first seal 42, the second seal 44, and the connector 46 (or connectors 46) being formed together simultaneously as a single continuous unit, the first seal 42, the second seal 44, and the connector 46 (or connectors 46) formed by vulcanization of rubber, including by known vulcanization methods. As is known, vulcanization of rubber includes a bath of sulphur and/or other additives, molding, and heating. In such an example, the first seal 42, the second seal 44, and the connector 46 (or connectors 46) are vulcanized rubber. "Vulcanized rubber" is a structural description of the sealing unit, not the process by which the sealing unit is made. In other words, the vulcanized rubber sealing unit has the structure of a vulcanized rubber component. When molded in the vulcanization process, the first seal 42, the second seal 44, and the connector 46 (or connectors 46) are molded simultaneously as a single continuous unit.

The first seal 42, the second seal 44, and the connector 46 (or connectors 46) are of the same material type. For example, the unitary seal may be any suitable type of rubber. The seal unit 40 is of a different material type than the material of the body 38 of the transfer ring 36. For example, the body 38 may be sintered metal, as described below.

The body 38 may be unitary. In other words, the body 38 is a single, uniform piece of material with no seams, joints, fasteners, or adhesives holding it together, i.e., formed simultaneously as a single continuous unit. As one example, the body 38 may be formed as a single continuous unit by sintering metal, including by known sintering methods. As is known, sintering of metal includes compacting material into a solid mass of material by heat and/or pressure without melting the material to liquification. In such an example, the body 38 is sintered metal. "Sintered metal" is a structural description of the body 38, not the process by which the body 38 is made. In other words, the sintered metal body 38 has the structure of a sintered metal component. When formed in the sintering process, the body 38 is a single continuous unit.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A shock absorber comprising:
an inner tube defining an inner volume;
a piston slidably disposed in the inner tube, the piston dividing the inner volume of the inner tube into a rebound working chamber and a compression working chamber;
an intermediate tube on the inner tube defining an intermediate chamber between the inner tube and the intermediate tube, the intermediate chamber being in fluid communication with the inner volume of the inner tube;
an outer tube;

the inner tube and the intermediate tube being in the outer tube, the outer tube defining a reserve chamber between the outer tube and the intermediate tube;

a valve fluidly connecting the intermediate chamber and the reserve chamber;

a transfer ring fluidly connecting the intermediate chamber and the valve;

the transfer ring including a body, a first seal positioned at a first end of the body, a second seal positioned at an opposite second end of the body, and a connector;

the first seal being between the body and the intermediate tube, a second seal between the body and the valve, and the connector being connected to the first seal and the second seal, the body including a surface defining a bore extending between the first end and the second end to fluidly interconnect the intermediate chamber and the valve, the body including an internal channel spaced apart from the surface of the bore, the connector extending through the channel from the first seal to the second seal.

2. The shock absorber of claim 1, wherein the first seal, the second seal, and the connector are of the same material type.

3. The shock absorber of claim 1, wherein the first seal, the second seal, and the connector are of a different material type than the body.

4. The shock absorber of claim 1, wherein the first seal, the second seal, and the connector are unitary.

5. The shock absorber of claim 1, further comprising a second connector spaced from the connector and extending through the body from the first seal to the second seal.

6. The shock absorber of claim 1, wherein the first seal, the second seal, and the connector are vulcanized rubber.

7. The shock absorber of claim 1, wherein the body of the transfer ring is sintered metal.

8. The shock absorber of claim 1, wherein the body of the transfer ring includes a first seal seat supporting the first seal and a second seal seat supporting the second seal, the internal channel extending from the first seal seat to the second seal seat with the connector in the internal channel.

9. The shock absorber of claim 1, wherein the first seal extends endlessly around the bore.

10. The shock absorber of claim 1, wherein the intermediate tube includes an orifice in fluid communication with the intermediate chamber, the bore of the transfer ring being in fluid communication with the orifice, and the first seal extending endlessly around the orifice.

11. The shock absorber of claim 1, wherein the transfer ring has an axis and the internal channel and the bore are elongated parallel to the channel.

12. The shock absorber of claim 1, wherein the transfer ring extends from intermediate tube to the valve.

13. The shock absorber of claim 1, wherein the intermediate chamber is in fluid communication with rebound working chamber.

14. The shock absorber of claim 1, wherein the inner tube includes an open orifice between the rebound working chamber and the intermediate chamber.

15. A shock absorber comprising:

an inner tube defining an inner volume;

a piston slidably disposed in the inner tube, the piston dividing the inner volume of the inner tube into a rebound working chamber and a compression working chamber;

an intermediate tube on the inner tube defining an intermediate chamber between the inner tube and the intermediate tube, the intermediate chamber being in fluid communication with the rebound working chamber;

an outer tube, the inner tube and the intermediate tube being in the outer tube, the outer tube defining a reserve chamber between the outer tube and the intermediate tube;

a valve fluidly connecting the intermediate chamber and the reserve chamber;

a transfer ring including a body having a bore fluidly connecting the intermediate chamber and the valve; and the transfer ring including a seal unit including a first seal between the transfer ring and the intermediate tube, a second seal between the transfer ring and the valve, and a connector connected to the first seal and the second seal;

the body of the transfer ring defining an internal channel spaced from the bore, the connector extending through the internal channel from the first seal to the second seal.

16. The shock absorber of claim 15, wherein the first seal, the second seal, and the connector are unitary.

* * * * *